(12) United States Patent
Huang et al.

(10) Patent No.: US 9,716,454 B2
(45) Date of Patent: Jul. 25, 2017

(54) DRIVING CIRCUIT AND DRIVING METHOD FOR PERMANENT MAGNET SYNCHRONOUS MOTOR

(71) Applicant: Silergy Semiconductor Technology (Hangzhou) LTD, Hangzhou, ZheJiang Province (CN)

(72) Inventors: Xiaodong Huang, Hangzhou (CN); Xinghao Zhang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 15/262,674

(22) Filed: Sep. 12, 2016

(65) Prior Publication Data

US 2017/0085196 A1 Mar. 23, 2017

(30) Foreign Application Priority Data

Sep. 17, 2015 (CN) .......................... 2015 1 0595488

(51) Int. Cl.
  *H02P 6/06* (2006.01)
  *H02P 6/182* (2016.01)
  *H02P 23/00* (2016.01)

(52) U.S. Cl.
  CPC .......... *H02P 6/182* (2013.01); *H02P 23/0004* (2013.01); *H02P 23/0009* (2013.01)

(58) Field of Classification Search
  CPC ... H02P 6/182; H02P 23/0004; H02P 23/0009
  USPC ...................................................... 318/400.06
  See application file for complete search history.

(56) References Cited

U.S. PATENT DOCUMENTS

| | | | |
|---|---|---|---|
| 6,388,416 B1* | 5/2002 | Nakatani ................. | H02P 6/085 318/700 |
| 7,714,529 B2 | 5/2010 | Chen et al. | |
| 9,317,019 B2 | 4/2016 | Huang | |
| 2006/0006825 A1* | 1/2006 | Inaguma ................. | H02P 21/22 318/432 |
| 2011/0285332 A1* | 11/2011 | Pollock ..................... | H02P 6/18 318/400.02 |

* cited by examiner

*Primary Examiner* — Erick Glass
(74) *Attorney, Agent, or Firm* — Michael C. Stephens, Jr.

(57) ABSTRACT

A driving circuit of a PMSM can include a current sampling circuit configured to generate a current sampling signal by sampling a stator current information of one phase of the permanent magnet synchronous motor; a BEMF circuit configured to receive the current sampling signal and a voltage sampling signal that represents a stator voltage of the phase, to estimate back electromotive force information of the phase, and to output a first voltage signal that represents the back electromotive force information; and a torque regulating circuit configured to generate an angle difference signal by calculating an angle difference between the first voltage signal and the current sampling signal, where the angle difference signal is configured to regulate an amplitude of a first U-shaped modulation wave such that a rotor current is in phase with the first U-shaped modulation wave for maximum torque per ampere.

12 Claims, 4 Drawing Sheets

US 9,716,454 B2

DRIVING CIRCUIT AND DRIVING METHOD FOR PERMANENT MAGNET SYNCHRONOUS MOTOR

RELATED APPLICATIONS

This application claims the benefit of Chinese Patent Application No. 201510595488.1, filed on Sep. 17, 2015, which is incorporated herein by reference in its entirety.

FIELD OF THE INVENTION

The present invention generally relates to the field of motor control techniques, and more particularly to driving circuits and methods for a permanent magnet synchronous motor.

BACKGROUND

Permanent magnet synchronous motors of relatively light weight, small size, simple structure, and high power density have played an important role in, e.g., industrial and agricultural production, as well as other applications. With the development of permanent magnetic materials and power electronic devices, permanent magnet synchronous motors are becoming more widely used. For some applications, the system cost may be controlled to a maximum extent, so position "sensorless" techniques may be applied in order to reduce system costs because a normal position sensor (e.g., photoelectric coded disk, rotatable transformer, etc.,) may be avoided. In some cases, vector control can be used in a position sensorless permanent magnet synchronous motor; however, such an approach may need an advanced processor in order to process the relatively complicated algorithm and heavy computational load.

DETAILED DESCRIPTION

Figure 1:
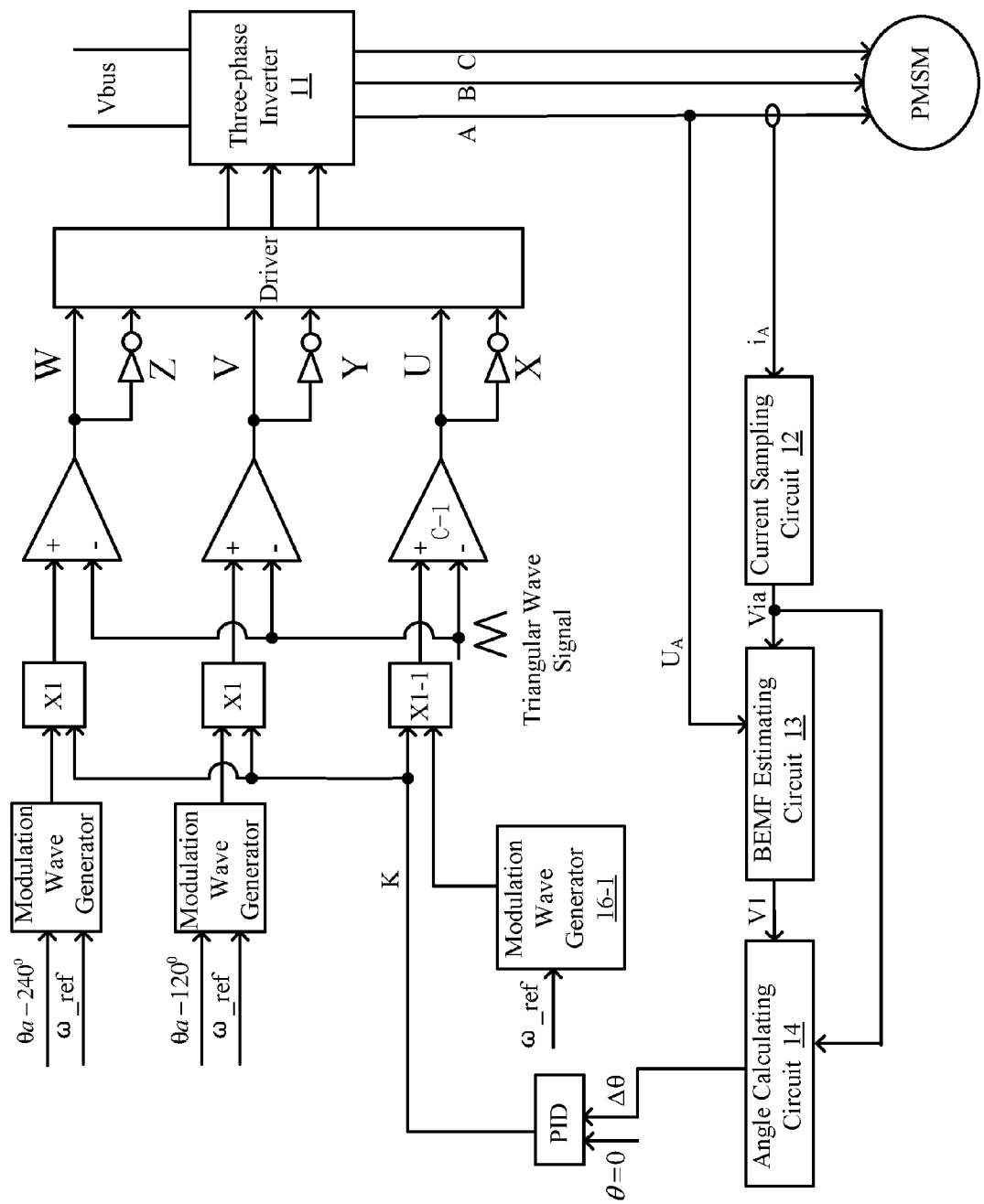
FIG. 1 is a schematic block diagram of a first example driving circuit for a permanent magnet synchronous motor, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In one embodiment, a driving circuit for a permanent magnet synchronous motor (PMSM) can include: (i) a current sampling circuit configured to generate a current sampling signal by sampling a stator current information of one phase of the permanent magnet synchronous motor; (ii) a back electromotive force (BEMF) circuit configured to receive the current sampling signal and a voltage sampling signal that represents a stator voltage of the phase, to estimate back electromotive force information of the phase, and to output a first voltage signal that represents the back electromotive force information; and (iii) a torque regulating circuit configured to receive the current sampling signal and the first voltage signal, and to generate an angle difference signal by calculating an angle difference between the first voltage signal and the current sampling signal, where the angle difference signal is configured to regulate an amplitude of a first U-shaped modulation wave such that a rotor current is in phase with the first U-shaped modulation wave for maximum torque per ampere.

In one embodiment, a method of driving a PMSM can include: (i) controlling a current of the PMSM by controlling switching states of switches in a three-phase inverter; (ii) sampling a current through a stator of one phase of the PMSM, to generate a current sampling signal; (iii) receiving the current sampling signal and a voltage sampling signal that represents a stator voltage of the phase, and estimating back electromotive force information of the phase, to generate a first voltage signal that represents the back electromotive force information; and (iv) receiving the current sampling signal and the first voltage signal, and obtaining an angle difference signal by calculating an angle difference between the first voltage signal and the current sampling signal, where the angle difference signal is configured to regulate an amplitude of an U-shaped modulation wave such that a rotor current is in phase with the U-shaped modulation wave for maximum torque per ampere.

Referring now to FIG. 1, shown is a schematic block diagram of a first example driving circuit for a permanent magnet synchronous motor, in accordance with embodiments of the present invention. In this particular example, three-phase inverter 11 can receive external voltage signal Vbus, and may generate three phase alternating voltage signals to a PMSM. A driver can generate pulse-width modulation (PWM) control signals to control the operating states of switches in the inverter of the PMSM in accordance with the rotor position information, so as to control an operating current of the PMSM. As shown in FIG. 1, three-phase inverter 11 may output three alternating voltage signals as A, B, and C.

In this example, the driving circuit may include current sampling circuit 12, back electromotive force (BEMF) estimating circuit 13, and a torque regulating circuit. The torque regulating circuit may include an angle calculating circuit 14 and a proportional-integral-derivative (PID) regulator. Current sampling circuit 12 can generate current sampling signal $i_A$ by sampling a current through a rotor of one phase (e.g., phase A) of the PMSM. BEMF estimating circuit 13 can receive current sampling signal Via and voltage sampling signal $U_A$ that represents a voltage of the same phase, and may generate voltage signal V1 (e.g., a sine wave signal) that represents the back electromotive force. In this example, voltage sampling signal $U_A$ may be obtained by directly sampling a voltage of a corresponding phase (e.g., phase A). Angle calculating circuit 14 can receive voltage signal V1 and current sampling signal Via, and may accordingly generate angle difference signal Δθ. The PID regulator may be used to receive angle difference signal Δθ and zero angle signal θ=0, and to generate proportion factor K.

Figure 2:
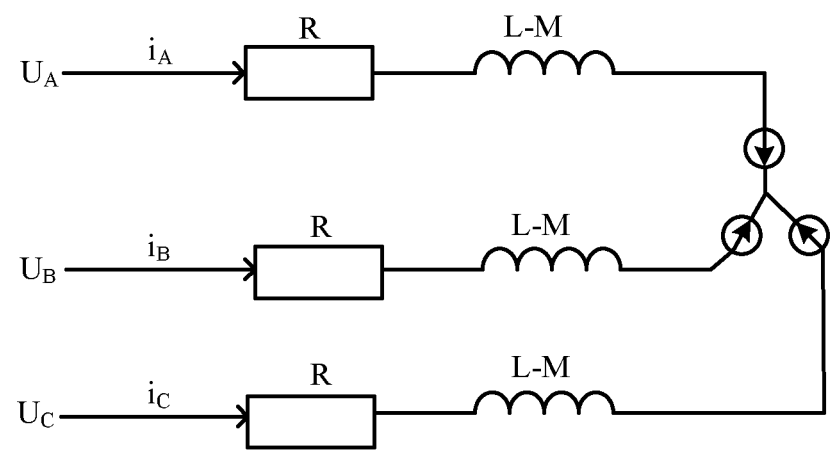
FIG. 2 is an equivalent model of a permanent magnet synchronous motor, in accordance with embodiments of the present invention.

Referring now to FIG. 2, shown is an equivalent model of a permanent magnet synchronous motor, in accordance with embodiments of the present invention. The following may introduce the procedure of estimating the back electromotive force information by BEMF estimating circuit 13. In FIG. 2, voltages across the rotor windings of phases A, B and C may be obtained as:

$$\begin{pmatrix} u_A \\ u_B \\ u_C \end{pmatrix} = \begin{pmatrix} R & 0 & 0 \\ 0 & R & 0 \\ 0 & 0 & R \end{pmatrix} \begin{pmatrix} i_A \\ i_B \\ i_C \end{pmatrix} + \begin{pmatrix} L-M & & \\ & L-M & \\ & & L-M \end{pmatrix} p \begin{pmatrix} i_A \\ i_B \\ i_C \end{pmatrix} + \begin{pmatrix} e_A \\ e_B \\ e_C \end{pmatrix}$$

Here, $u_A$, $u_B$, $u_C$ can denote voltages (V) across the stator windings of phases A, B, and C, $i_A$, $i_B$, $i_C$ can denote currents (A) through stator windings of phases A, B, and C, $e_A$, $e_B$, $e_C$ can denote back electromotive force (V) of stator windings of phases A, B, and C, R may denote the phase resistance of the motor, L can denote the self-inductance (H) of each phase winding, M can denote the mutual inductance (H) between every two phase windings, and "p" can denote the differential operator, p=d/dt.

The following may describe the phase voltage and the phase current of the phase A as examples, and the phase voltage of the phase A can be obtained according to the above described arrays:

$$u_A = Ri_A + (L-M)pi_A + e_A \quad (1)$$

Substituting p=d/dt to equation (1), the differential equation of the phase current $i_A$ can be:

$$\frac{di_A}{dt} = -\frac{R}{L-M}i_A + \frac{u_A}{L-M} - \frac{1}{L-M}e_A \quad (2)$$

In order to estimate the back electromotive force eA, BEMF estimating circuit 13 may employ a sliding mode controller and/or observer, in order to establish simulation calculation.

Sliding mode surface S may be selected as: S=î−i, where î can denote the estimation value of the sliding mode observer, and "I" may denote the practical phase current value. The sliding mode observer may be implemented according to the equivalent circuit equation of the motor and the sliding mode surface:

$$\frac{d\hat{i}_A}{dt} = -\frac{R}{L-M}\hat{i}_A + \frac{u_A}{L-M} - \frac{1}{L-M}\text{sign}(\hat{i}_A - i_A) \quad (3)$$

As shown in equation (3), "sign" is the switch function:

$$\text{sign}(x) = \begin{cases} k, & x \geq 0 \\ -k, & x < 0 \end{cases}$$

When k is larger than or equal to the amplitude of the absolute value of $c_A$, equation (3) is true, and subtracting equation (2) from equation (3) may obtain:

$$\frac{d(\hat{i}_A - i_A)}{dt} = -\frac{R}{L-M}(\hat{i}_A - i_A) + \frac{e_A}{L-M} - \frac{1}{L-M}\text{sign}(\hat{i}_A - i_A) \quad (4)$$

When the system enters the sliding mode surface, that is S=î−i→0, so equation (5) can be obtained from equation (4):

$$e_A = \text{sign}(\hat{i}_A - i_A) \quad (5)$$

It can be seen from equation (5) that back electromotive force $e_A$ can be represented by a function sign, and the rotor position information may be obtained according to back electromotive force $e_A$. Those skilled in the art will recognize that back electromotive force $e_A$ is a step value obtained according to the switch function, and may be converted to a sine wave signal through a low-pass filter.

Figure 3:
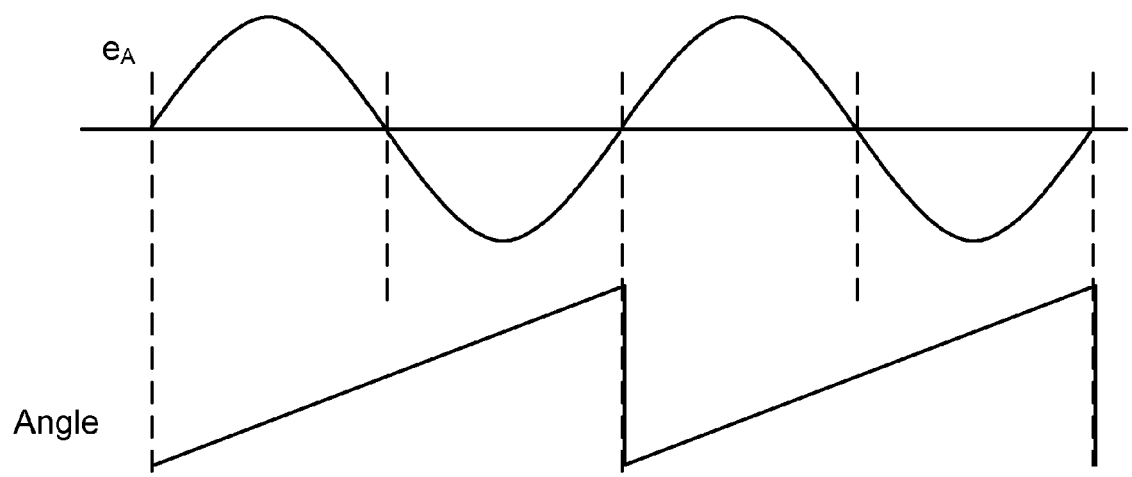
FIG. 3 is a waveform diagram of an example relationship between back electromotive force and rotor position information of phase A, in accordance with embodiments of the present invention.

Referring now to FIG. 3, shown is a waveform diagram of an example relationship between the back electromotive force and rotor position information of phase A, in accordance with embodiments of the present invention. As shown, the interval that the angle changes from 0 to 2n is set as one sine wave cycle of back electromotive force $e_A$. Angle calculating circuit 14 may generate an angle difference between the angle of the first voltage signal and the angle of the phase current. The PID regulator obtains the proportion factor K via operation based on the angle difference signal Δθ and the zero angle signal θ=0.

In this example, the PWM control circuit may include three PWM control sub-circuits. Each PWM control sub-circuit may include a modulation wave generator, a multiplication circuit, and a switching signal generator. As shown in the example of phase A in FIG. 1, the PWM control sub-circuit may include modulation wave generator 16-1, multiplication circuit X1-1, and switching signal generator C-1. Modulation wave generator 16-1 may generate a first U-shaped modulation wave of a fixed frequency according to a predetermined angular velocity (e.g., ω_ref). The first U-shaped modulation wave can be a half a half-cycle wave with an amplitude that is a predetermined value. Similarly, the remaining two modulation wave generators can also generate two first U-shaped modulation waves in the same way. As the phase difference between every two rotor phases is 120° in accordance with the operating principles of the three-phase inverter, the phase difference between every two first U-shaped modulation waves is thus 120°. Also, angular velocity ω_ref can be set in advance according to the operating current of the motor.

Multiplication circuit X1-1 can receive the first U-shaped modulation wave and the proportion signal K, and may generate a second U-shaped modulation wave. Switching signal generator C1-1 can receive the second U-shaped modulation wave and a triangular wave signal, and may generate a PWM control signal for phase A. The PWM control signal for phase A may be configured to turn on and off a switch of a corresponding phase of the three-phase inverter, in order to regulate a voltage of the permanent magnet synchronous motor generated by the three-phase inverter. The triangular wave signal may be provided by an external triangular wave generator.

In particular embodiments, regulating the maximum torque per ampere can include, when the phase difference Δθ between the phase of voltage signal V1 that represents the back electromotive force and the phase of the phase current is not zero, the proportion factor generated by the PID regulator may affect the amplitude of the U-shaped modulation wave. Thus, the duty cycle of the PWM control signal may be changed accordingly, and the voltage of the permanent magnet synchronous motor generated by the three-phase inverter can also be changed. When the voltage of the motor changes, the current thereof may change accordingly, and the phase difference between the back electromotive force and the phase current of the permanent magnet synchronous motor may continue to change until the phase difference is near zero, based on the auto-balance characteristic of the torque-angle when the rotating speed of the motor and the load remains unchanged. In this way, the operating efficiency of the motor can be highest due to the maximum torque per ampere of the permanent magnet synchronous motor being controlled.

In certain embodiments, the U-shaped modulation wave can essentially guarantee the operating current of the permanent magnet synchronous motor to be a sine wave current, so as to optimize the control scheme. For example, the back electromotive force information that represents the rotor position of phase A can be obtained by sampling the phase voltage and phase current of phase A. The amplitude of the U-shaped modulation wave can be regulated according to the phase difference between the back electromotive force and the phase current. Also, the phase difference may be obtained according to the back electromotive force information, such that the voltage of the motor generated by the inverter can be controlled, and the phase difference between the back electromotive force and the phase current can be controlled to be zero. In this way, the back electromotive force information of other two phases can be determined by sampling the phase voltage and phase current of one phase, instead of using a position sensor to detect the stator position information, and all three phases can achieve maximum torque.

Figure 4:
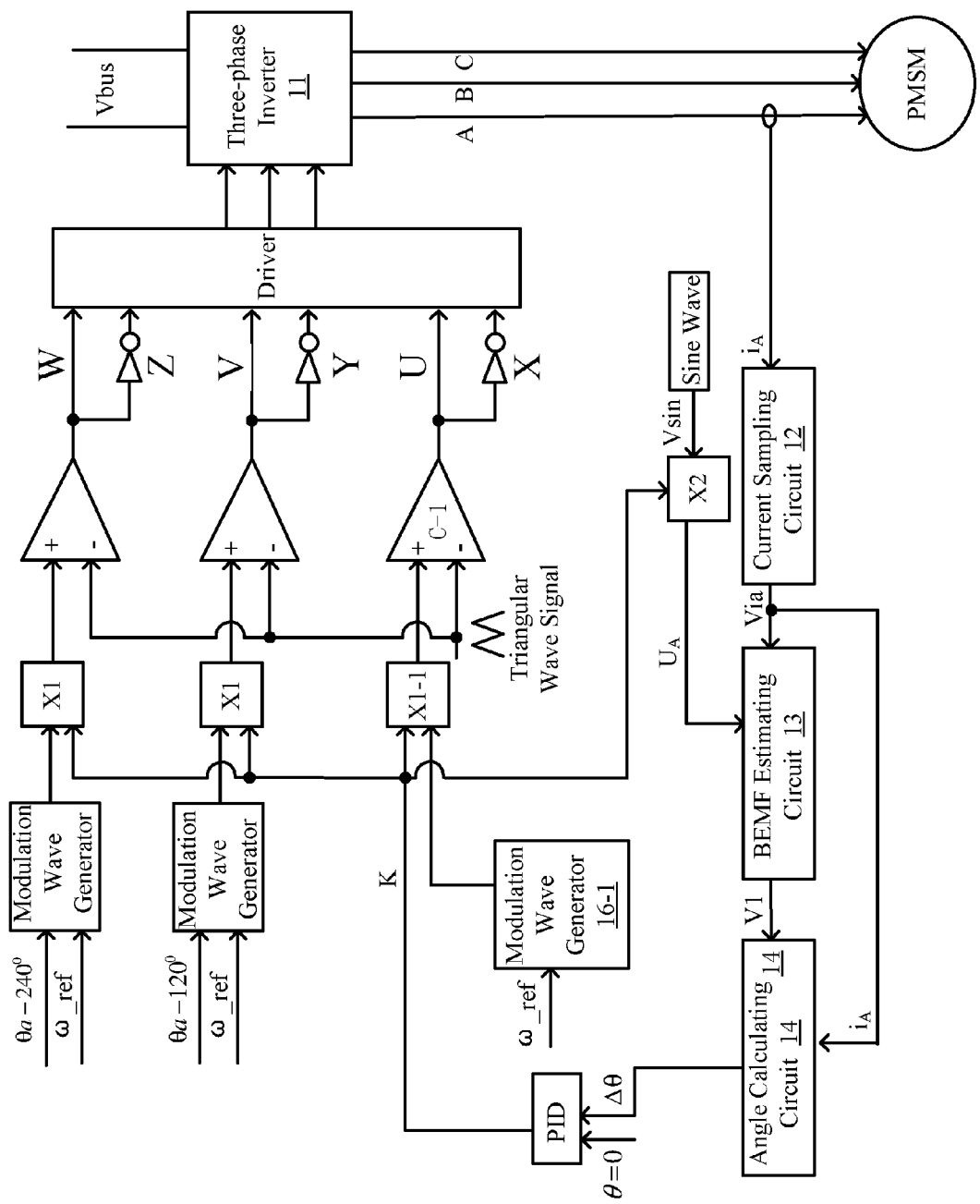
FIG. 4 is a schematic block diagram of a second example driving circuit for a permanent magnet synchronous motor, in accordance with embodiments of the present invention.

Referring now to FIG. 4, shown is a schematic block diagram of a second example driving circuit for a permanent magnet synchronous motor, in accordance with embodiments of the present invention. In this particular example, the driving circuit may also include multiplication circuit X2 that receives sine wave signal Vsin and proportion factor K, and generates voltage sampling signal $U_A$ after a multiplication operation, where the phases of the sine wave signal and the first U-shaped modulation wave are the same. Voltage sampling signal $U_A$ may be in direct proportion to the voltage signal sampled in the above example, and the proportion factor may be K/Vbus.

In particular embodiments, the back electromotive force to represent the rotor position information can be obtained by sampling the phase voltage and the phase current of a corresponding phase. In this example, the back electromotive force is a fixed function. Thus, the maximum torque per ampere can be achieved by regulating the phase difference between the back electromotive force and the phase current according to the back electromotive force. In this way, sine wave control of the motor current by can be achieved by setting the U-shaped modulation wave in a fixed frequency, and maximum torque can be achieved according to the phase difference.

Also in particular embodiments, a driving method for a PMSM, which controls the operating current of the PMSM by controlling the switching states of the switches in the three-phase inverter, can include sampling a current through a stator of one phase of the PMSM, in order to obtain a current sampling signal. The method can also include receiving the current sampling signal and a voltage sampling signal to represent a stator voltage of the same phase, and estimating the back electromotive force information thereof, in order to generate a first voltage signal for representing the back electromotive force information. The method can also include receiving the current sampling signal and the first voltage signal, and obtaining an angle difference signal by calculating an angle difference between the first voltage signal against the current sampling signal. The angle difference signal can regulate the amplitude of one U-shaped modulation wave, such that the rotor current phase in phase with the U-shaped modulation wave, to achieve the maximum torque per ampere.

The method can also include receiving the first voltage signal (e.g., V1) and the current sampling signal, and obtaining the angle difference signal by calculating an angle difference between the first voltage signal and the current sampling signal. The method can also include receiving the angle difference signal and an zero angle signal, and generating a proportion factor through a PID regulator. The method can also include generating a first U-shaped modulation wave with a fixed frequency according to a predetermined angular velocity, where the phase difference between every two first U-shaped modulation wave is 120°. The method can also include multiplying each of the first U-shaped modulation waves with the proportion factor, and generating a second U-shaped modulation wave, comparing each of the second U-shaped modulation waves against a triangular wave signal, and generating a PWM control signal for a corresponding phase. The PWM control signal may be configured to turn on and off a switch of a corresponding phase of the three-phase inverter, in order to regulate a voltage of the permanent magnet synchronous motor generated by the three-phase inverter.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A driving circuit for a permanent magnet synchronous motor (PMSM), the driving circuit comprising:
   a) a current sampling circuit configured to generate a current sampling signal by sampling a stator current information of one phase of said permanent magnet synchronous motor;
   b) a back electromotive force (BEMF) circuit configured to receive said current sampling signal and a voltage sampling signal that represents a stator voltage of said phase, to estimate back electromotive force information of said phase, and to output a first voltage signal that represents said back electromotive force information; and
   c) a torque regulating circuit configured to receive said current sampling signal and said first voltage signal, and to generate an angle difference signal by calculating an angle difference between said first voltage signal and said current sampling signal, wherein said angle difference signal is configured to regulate an amplitude of a first U-shaped modulation wave such that a rotor current is in phase with said first U-shaped modulation wave for maximum torque per ampere.

2. The driving circuit according to claim 1, wherein said torque regulating circuit comprises:
   a) an angle calculating circuit configured to receive said first voltage signal and said current sampling signal, and to generate said angle difference signal by calculating an angle difference between said first voltage signal and said current sampling signal; and b) a proportional-integral-derivative (PID) regulator configured to receive said angle difference signal and a zero angle signal, and to generate a proportion factor.

3. The driving circuit of claim 1, wherein said BEMF estimating circuit is configured to generate said back electromotive force information represented by a switch function through a sliding calculation, wherein said back electromotive force information comprises a complete sine wave in one operating cycle.

4. The driving circuit of claim 2, wherein said driving circuit further comprises a pulse-width modulation (PWM) control circuit having three PWM control sub-circuits, wherein each of said PWM control sub-circuits comprises:

a) a modulation wave generator configured to generate said first U-shaped modulation wave with a fixed frequency according to a predetermined angular velocity, wherein a phase difference between every two first U-shaped modulation waves is 120°;

b) a first multiplication circuit configured to receive said first U-shaped modulation wave and said proportion factor, and to generate a second U-shaped modulation wave; and c) a switching signal generator configured to receive said second U-shaped modulation wave and a triangular wave signal, and to generate a PWM control signal for a corresponding phase, wherein said PWM control signal is configured to control a switch of a corresponding phase of a three-phase inverter to regulate a voltage of said permanent magnet synchronous motor generated by said three-phase inverter.

5. The driving circuit of claim 1, wherein said voltage sampling signal is obtained by sampling stator voltage information of a corresponding phase that is the same phase as the phase for sampling said stator current information.

6. The driving circuit of claim 2, further comprising a second multiplication circuit configured to receive a sine wave signal and said proportion factor, and to generate said voltage sampling signal after a multiplication operation, wherein said sine wave signal is in phase with said first U-shaped modulation wave.

7. A method of driving a permanent magnet synchronous motor (PMSM), the method comprising:

a) controlling a current of said PMSM by controlling switching states of switches in a three-phase inverter;

b) sampling a current through a stator of one phase of said PMSM, to generate a current sampling signal;

c) receiving said current sampling signal and a voltage sampling signal that represents a stator voltage of said phase, and estimating back electromotive force information of said phase, to generate a first voltage signal that represents said back electromotive force information; and d) receiving said current sampling signal and said first voltage signal, and obtaining an angle difference signal by calculating an angle difference between said first voltage signal and said current sampling signal, wherein said angle difference signal is configured to regulate an amplitude of an U-shaped modulation wave such that a rotor current is in phase with said U-shaped modulation wave for maximum torque per ampere.

8. The method of claim 7, further comprising:

a) receiving said first voltage signal and said current sampling signal, and obtaining said angle difference signal by calculating said angle difference between said first voltage signal and said current sampling signal; and b) receiving said angle difference signal and an zero angle signal, and generating a proportion factor through a proportional-integral-derivative (PID) regulator.

9. The method of claim 7, further comprising obtaining said back electromotive force information represented by a switch function through a sliding calculation, wherein said back electromotive force information comprises a complete sine wave in one operating cycle.

10. The method of claim 8, further comprising:

a) generating said first U-shaped modulation wave with a fixed frequency according to a predetermined angular velocity, wherein a phase difference between every two first U-shaped modulation wave is 120°;

b) multiplying each of said first U-shaped modulation waves with said proportion factor, and generating a second U-shaped modulation wave; and c) comparing each of said second U-shaped modulation waves against a triangular wave signal, and generating a PWM control signal for a corresponding phase, wherein said PWM control signal is configured to control a switch of a corresponding phase of said three-phase inverter to regulate a voltage of said permanent magnet synchronous motor generated by said three-phase inverter.

11. The method of claim 7, wherein said voltage sampling signal is obtained by sampling stator voltage information of a corresponding phase that is the same phase as the phase for sampling said stator current information.

12. The method of claim 8, further comprising receiving a sine wave signal and said proportion factor, and generating said voltage sampling signal after a multiplication operation, wherein said sine wave signal is in phase with said first U-shaped modulation wave.

* * * * *